April 11, 1950  L. L. WEBER ET AL  2,503,696
UNIVERSAL MOWER HITCH
Filed March 6, 1947  2 Sheets-Sheet 2

Louis L. Weber
Thomas T. Kling
Thomas L. Franken
INVENTORS.

BY Zugelter & Zugelter
Attys.

Patented Apr. 11, 1950

2,503,696

UNITED STATES PATENT OFFICE 2,503,696

UNIVERSAL MOWER HITCH

Louis L. Weber, Thomas T. Kling, and Thomas L. Franken, Cincinnati, Ohio, assignors to The Lodge and Shipley Company, Cincinnati, Ohio, a corporation of Ohio Application March 6, 1947, Serial No. 732,893

5 Claims. (Cl. 56—26)

1

This invention relates to a hitch for lawn mowers, and particularly to a hitch adapted for attachment to any size or type of conventional lawn mower.

One of the objects of the invention is to provide means for attaching lawn mowers to a garden tractor or other power operated machine.

Another object is to provide means for attaching lawn mowers of any size or type to a tractor or the like without material alterations to the mowers.

A further object is to provide simple and durable means for quickly converting a hand driven lawn mower to a power driven lawn mower.

Another object of the invention is to provide inexpensive and easily manufactured parts to attain the aforementioned objectives.

These and other objects and advantages are attained by the means described in the following specifications and illustrated upon the accompanying drawings, in which.

The present invention provides a simple, durable and inexpensive means for attaching a conventional hand driven lawn mower to a power driven garden tractor or the like. It will be found advantageous to a home owner or gardener who wishes to utilize a hand mower by attaching it to a garden tractor, thereby saving the cost of a power lawn mower. As will be shown, the device of the invention is adapted to engage conventional reel type lawn mowers of various widths and styles, making it unnecessary for a gardener to buy both a tractor and a power mower, since it is a simple matter, with this device, to make use of a hand mower which he might have owned previously to the purchase of the tractor.

Figure 1:
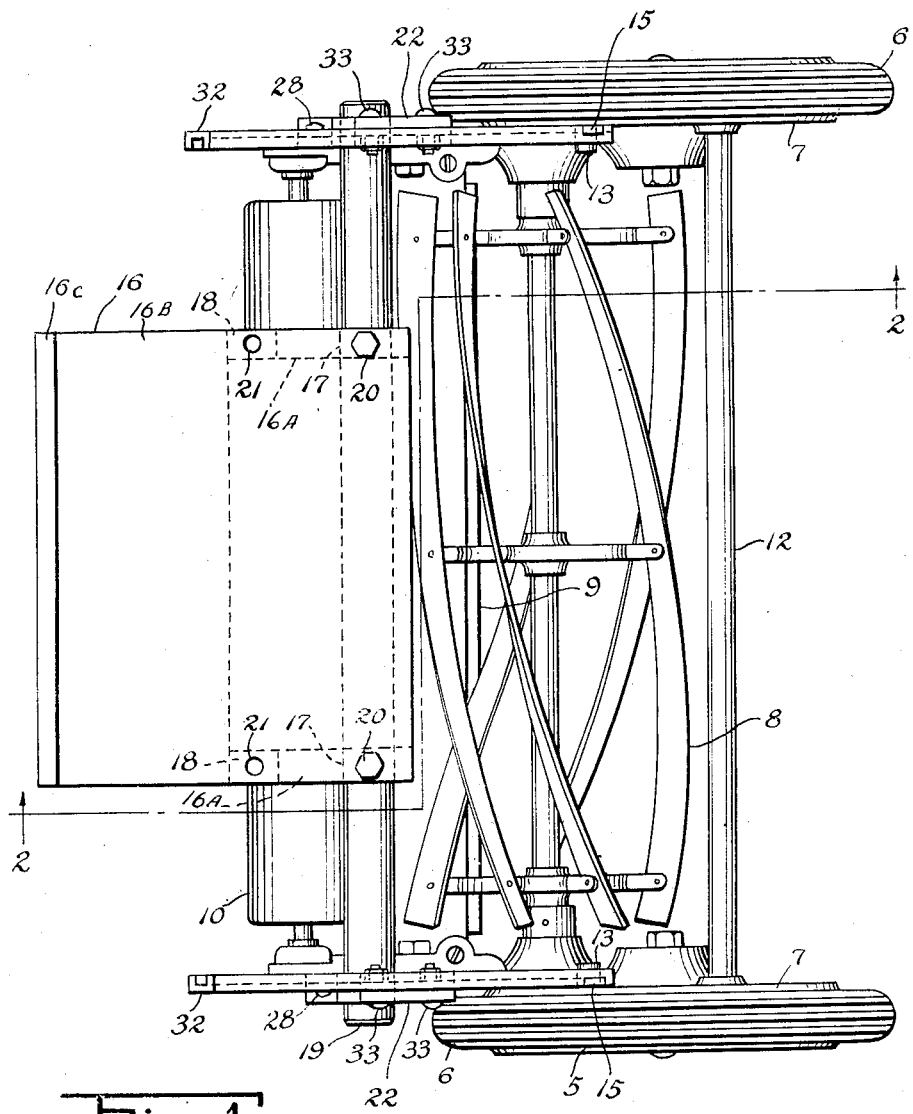
Fig. 1 is a plan view of a lawn mower equipped with the device of the present invention.

Referring to Fig. 1, 5 generally indicates a lawn mower having traction wheels 6, rotatable on side frames 7, said frames including suitable gearing which rotates the blades of the cutter reel 8 over the stationary cutter bar 9 to produce a shearing action on grass and other vegetation as the mower is moved forward over said vegetation. A roller is indicated at 10, while 12 indicates a cross bar which supports the side frames 7 in spaced parallelism.

Common to most lawn mowers of the reel type is a handle mounting pivot lug 13 on the inside face of each side frame, said lug being generally

2 flanked on two sides by stop lugs 15, which limit the up and down movement of the mower handle pivoted on the handle mounting lugs 13. The pivot lugs 13 may vary in form on different types of mowers, as will be explained.

A motor mount, indicated at 16, may be an integral part of a garden tractor. For purposes of clarity, the motor and other parts of the tractor have been omitted from the drawings. In the illustrated motor mount, two pairs of half-round grooves 17 and 18 are shown as alternate locations for mounting a mower bar 19, each pair of grooves being in axial alignment. The grooves 17 and 18 may be formed in the flanges 16A, which depend from the plate portion 16B of the motor mount at opposite ends thereof, as shown upon Fig. 1. As will be understood, the upstanding wall 16C provides the means of securing the motor mount to a tractor frame.

The mower bar 19, which may be of sufficient length to accommodate lawn mowers of substantial width, is attached to the motor mount 16 by means of bolts 20 inserted through bored apertures 21 in the motor mount and registering apertures in the mower bar 19, said bar being disposed in the pair of grooves best suited to the particular mower being used.

Figure 2:
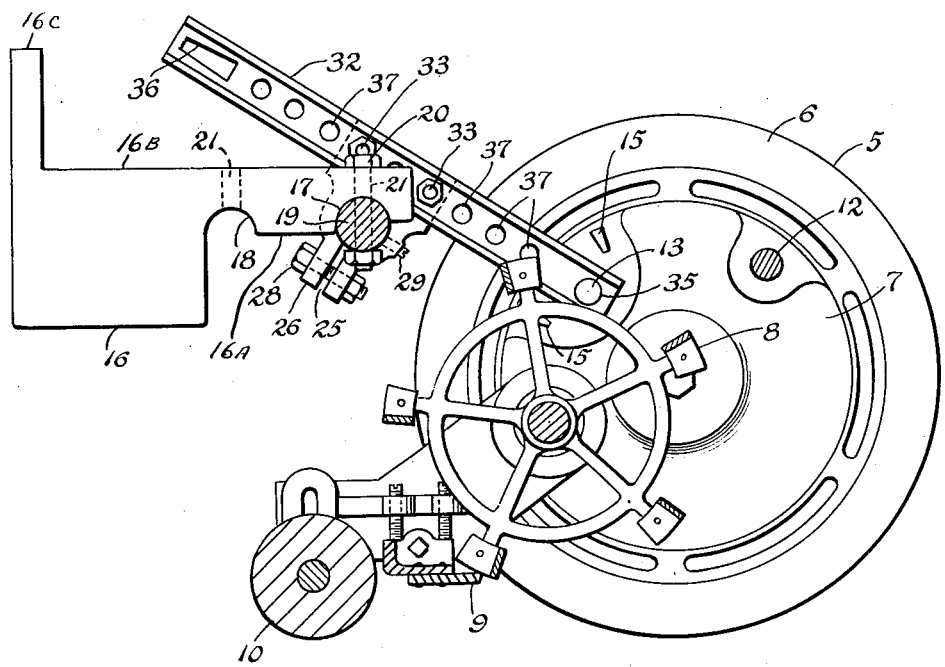
Fig. 2 is a cross-sectional view taken on line 2—2 of Fig. 1.
Figure 3:
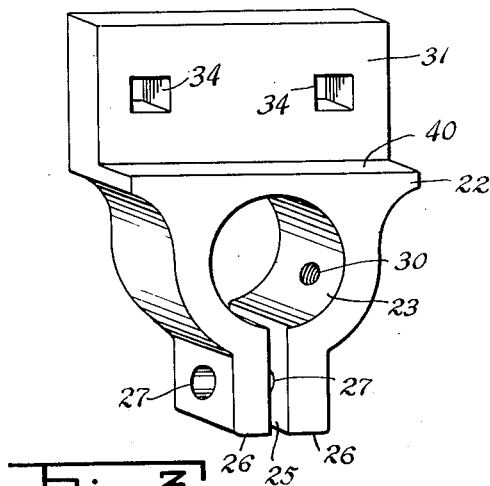
Fig. 3 is an enlarged perspective view of a hitch clamp, which forms part of the invention.

A mower hitch clamp 22, indicated in detail in Fig. 3, is adapted to fit on each end of the mower bar 19, as shown in Figs. 1 and 2, the clamp being adjustable to any angular position on the mower bar. The hitch clamp is suitably bored as at 23, the bore being of substantially the same diameter as the mower bar 19, and is sawed or otherwise machined at its lower extremity to form the slot 25. The depending lugs 26 are apertured as at 27 for the reception of a bolt 28, which upon tightening, causes the hitch clamp 22 to firmly grip the mower bar 19. Further clamping action is afforded by the set screw 29 threaded into a cooperating aperture 30 in the side of the hitch clamp 22. The upper portion of the hitch clamp is provided with a mounting face or seat 31, and an adjacent guide shoulder or ledge 40, against which a side bracket or bar 32 abuts, being held thereon by means of bolts 33, preferably carriage bolts. The mounting seat or face 31 of the hitch clamp may be provided with squared apertures 34 for the reception of the square shanks of the carriage bolts 33.

The side bracket or bar 32, fabricated from an elongated metal strip of heavy gage preferably U-shaped in cross-section, is provided with a round hole 35 at one end and an angular or trapezoidal hole 36 at its opposite end. The round hole 35 in the side bracket 32 is adapted to engage a single round lug pivot 13 as illustrated in Figs. 1 and 2, whereas the trapezoidal hole 36 is adapted to engage the double lugged type or angular form of mower handle mount (not illustrated). The side bracket or bar 32 is further provided with a series of holes 37 along its length, between the round hole 35 and the trapezoidal hole 36, the two outer holes of any group of three adjacent holes 37 being in register with the squared apertures 34 in the hitch clamp 22.

From the foregoing explanation, it is obvious that mounting a hand driven lawn mower on a tractor is a very simple matter when the device of the present invention is used. The mower bar 19 is anchored to the motor mount 16 by means of the bolts 20, being disposed in that pair of half-round grooves 17 or 18 best suited to the mower being used. A hitch clamp 22 is then slipped over each end of the mower bar 19, but not tightened or clamped thereon until later. Assuming that the original handle of the mower has been removed, one side bar or bracket 32 is positioned to engage a mower handle mounting lug 13 by means of the aperture 35, or if the mower is the type requiring the trapezoidal hole 36 for proper mounting, that end of the side bracket is engaged with the handle mounting lug. Selecting the pair of side bracket holes 37 best suited to the particular mower being used, the side bracket is then secured to the hitch clamp 22 by means of the bolts 33, the flat side of the bracket abutting the mounting face or seat 31 of the hitch clamp 22. This process is duplicated with the other side bracket, it being understood of course, that the two side brackets 32 will be in alignment.

The clamping bolt 28 in each hitch clamp 22 is then tightened to cause the said clamps to firmly grip the mower bar 19, and, to preclude possible rotation of the hitch clamps on the mower bar, the set screws 29 are also tightened. The lawn mower is then ready to function as it is advanced forward by the tractor to which it is attached.

To disengage the lawn mower from the tractor requires only the removal of the two bolts 20 which anchor the mower bar 19 to the motor mount 16. Once assembled, as hereinbefore described, the universal mower hitch may remain a permanent part of the lawn mower, ready for future use by the simple expedient of attaching the mower to the tractor by means of the two bolts 20.

As is obvious from a study of the drawings, the device is capable of various adjustments, making it possible to use various sizes and types of lawn mowers. It is also possible to position the lawn mower at a point most advantageous in the operation of the tractor. For instance, the mower bar 19 may be disposed within the rearward pair of grooves 18 instead of the forward pair 17, as shown in Figs. 1 and 2, thus bringing the mower closer to the tractor and reducing the leverage necessary in turning the tractor in the course of mowing a lawn. As will be understood, the operator of the tractor, in making a turn to reverse direction for instance, simply raises the tractor handles sufficiently to bring the tractor wheel out of contact with the lawn surface, the handle mounting lugs 13 acting as the fulcrum in this maneuver, while the turn is made on the traction wheels 6 of the mower. The device of the present invntion provides for the reduction of leverage, thereby reducing the amount of energy required of an operator in mowing a lawn.

The construction of some lawn mowers may require a slight deviation in the assembly of the mower hitch shown upon the drawings. In such cases it may be necessary to invert the hitch clamp 22. This is easily done, since the construction of the device renders the hitch clamp capable of any angular position on the mower bar 19.

It is to be understood that various structural modifications and changes may be made within the scope of the appended claims, without departing from the spirit of the invention.

What is claimed is:

1. A lawn mower hitch comprising an elongated transverse bar adapted to be coupled to a tractor frame, an angularly adjustable clamp at each end of said bar, means for securing said clamps to the bar, a pair of spaced push bars adapted to engage the handle mounting lugs of a lawn mower, and means for securing said clamps to said push bars at pre-selected points in the lengths thereof.

2. In a lawn mower hitch a pair of spaced elongated push bars adapted to engage the handle mounting lugs of a lawn mower, a pair of hitch clamps, a transverse mower bar mounted in said hitch clamps and adapted to be coupled to a tractor frame, means for adjustably securing said hitch clamps to said push bars, and means for securing said mower bar against rotational and longitudinal movement in said hitch clamps.

3. An adjustable hitch for attaching a lawn mower to a tractor frame which comprises an elongated cylindrical bar, means for attaching said bar to the tractor frame transversely thereof, a pair of split ring clamps slidable lengthwise of said bar and rotatable about said bar, means on each of said clamps for squeezing the ring to fix the clamp to the transverse bar, each split ring clamp having an outwardly extending tongue attached to the clamp and integral therewith, a pair of elongated push bars, an end of each push bar being adapted to be attached to a handle mounting lug of the lawn mower, and means for securing said clamps to said push bars at pre-selected points in the lengths thereof.

4. An adjustable hitch for attaching a lawn mower to a tractor frame which comprises an elongated cylindrical bar, means for attaching said bar to the tractor frame transversely thereof, a pair of split ring clamps slidable lengthwise of said bar and rotatable about said bar, means on each of said clamps for squeezing the ring to fix the clamp to the transverse bar, each split ring clamp having an outwardly extending tongue attached thereto and integral therewith, a pair of elongated push bars, an end of each push bar being adapted to be attached to a handle mounting lug of the lawn mower, each of said tongues being provided with a pair of spaced openings, each of said push bars being provided with a plurality of spaced openings, the openings in said tongues being adapted for registry with the openings in said push bars, and bolt means in said openings for holding said clamps in assembled relation with said push bars at pre-selected points in the lengths thereof.

5. An adjustable hitch for attaching a lawn mower to a tractor frame which comprises an elongated cylindrical bar, means for attaching said bar to the tractor frame transversely thereof, a pair of split ring clamps slidable lengthwise of said bar and rotatable about said bar, means on each of said clamps for squeezing the ring to fix the clamp to the transverse bar, each split ring clamp having an outwardly extending tongue attached thereto and integral therewith, a pair of elongated push bars, an end of each push bar being adapted to be attached to a handle mounting lug of the lawn mower, each of said tongues being provided with a pair of spaced openings, each of said push bars being provided with a plurality of spaced openings, the openings in said tongues being adapted for registry with the openings in said push bars, each of said clamps being provided with a shoulder directed toward the openings in the tongue, each of the openings in the tongue being equally spaced from said shoulder, each of said push bars having a straight edge, each of the openings in the push bar being equally spaced from the straight edge, the straight edge of each of the push bars being adapted to substantially abut the shoulder of one of the clamps when the openings in the tongues of the clamps are aligned with openings in the push bars, and bolt means in said openings for holding said clamps in assembled relation with said push bars at preselected points in the length thereof.

LOUIS L. WEBER.
THOMAS T. KLING.
THOMAS L. FRANKEN.

REFERENCES CITED

The following references are of record in the file of this patent:

UNITED STATES PATENTS

| Number | Name | Date |
|---|---|---|
| 1,449,597 | Gomez | Mar. 27, 1923 |
| 1,466,802 | Nobbs | Sept. 4, 1923 |
| 1,566,230 | Scanlan | Dec. 15, 1925 |
| 1,625,886 | Felton | Apr. 26, 1927 |
| 1,657,514 | Miller | Jan. 31, 1928 |
| 1,768,673 | Donald | July 1, 1930 |
| 1,950,023 | Allen | Mar. 6, 1934 |
| 2,374,533 | Fulton | Apr. 24, 1945 |